US007484740B2

(12) United States Patent
Miller

(10) Patent No.: US 7,484,740 B2
(45) Date of Patent: Feb. 3, 2009

(54) PROJECTION AND ACTUATION DEVICE FOR A WALKING STABILIZER

(76) Inventor: Jonathan Jay Miller, 3010 W. Fargo, Chicago, IL (US) 60645

( * ) Notice: Subject to any disclaimer, the term of this patent is extended or adjusted under 35 U.S.C. 154(b) by 565 days.

(21) Appl. No.: 11/171,311

(22) Filed: Jul. 1, 2005

(65) Prior Publication Data

US 2007/0034243 A1 Feb. 15, 2007

(51) Int. Cl.
*B62B 1/00* (2006.01)
*B62B 11/00* (2006.01)
*A45B 3/00* (2006.01)
*A45B 3/02* (2006.01)
*A61H 3/00* (2006.01)
*A63B 15/00* (2006.01)

(52) U.S. Cl. ............................ 280/87.021; 280/87.041; 280/87.01; 280/47.34; 280/47.38; 135/65; 135/67; 362/102

(58) Field of Classification Search ............ 280/87.021, 280/87.041, 87.01, 47.34, 47.38; 135/65, 135/67; 362/102
See application file for complete search history.

(56) References Cited

U.S. PATENT DOCUMENTS 5,538,268 A * 7/1996 Miller ..................... 280/87.05
5,575,294 A * 11/1996 Perry et al. ................. 600/587
6,330,888 B1 * 12/2001 Aravantinos et al. .......... 135/66
6,338,355 B1 * 1/2002 Cheng ......................... 135/67
6,463,947 B1 * 10/2002 Wipperfurth ................. 135/65
7,052,030 B2 * 5/2006 Serhan .................... 280/304.1
2002/0153684 A1 * 10/2002 Sung ..................... 280/87.021
2004/0079405 A1 * 4/2004 Sanders et al. ................ 135/67
2005/0001398 A1 * 1/2005 Serhan .................... 280/87.01

* cited by examiner

*Primary Examiner*—Christopher P Ellis
*Assistant Examiner*—John R Olszewski
(74) *Attorney, Agent, or Firm*—Martin Faier; James M. Faier; Faier & Faier, P.C.

(57) ABSTRACT

A walking stabilizer equipped to combat the effects of akinesia paradoxica by employing a novel method and device to regulate and actuate a projection instrument which generates a pattern perpendicular to the user's direction of travel. The regulating and actuating device comprises a two pole series switch circuit configuration in tandem with the walking stabilizer's novel dual action braking mechanism. The projection device is only operable when the user concurrently selects its use and when the walker stabilizer is free for movement or in contact with the patient.

15 Claims, 2 Drawing Sheets

PROJECTION AND ACTUATION DEVICE FOR A WALKING STABILIZER

FIELD OF INVENTION

The present invention relates to a method and device to regulate and actuate a projection instrument mounted to a walking stabilizer which generates a pattern or line perpendicular to the direction of travel.

BACKGROUND AND DESCRIPTION OF THE RELATED ART

A common manifestation of Parkinson's disease or of other related nervous system disorders in a patient is the occurrence of an akinetic episode. A patient who experiences an akinetic episode freezes in place or exhibits a form of start hesitation. The akinetic episodes momentarily may affect the arms, feet or legs; however it is more common for the patient to loose movement in the feet and legs. During an akinetic episode the patient's ability to walk is impaired and is unable to make forward progress. The freezing, formally termed akinesia paradoxica usually lasts for seconds to minutes, but in the extreme can last for hours. The neurologist Joseph Jankovic M.D. fully describes the phenomena of akinesia paradoxica in Clinical Neuropharmacology, Vol. 5, Suppl. 1, pg. S21, 1982.

There are a number of known clinical methods to combat the affects of akinesia paradoxical, most notably the use of external stimuli which "tricks" the brain to end the akinetic episode. Among the external stimuli are sound cues, such as the playing of marching music, introducing loud noise, or having the patient count. Additional forms of external stimuli are visual cues such as drawing or projecting a line or placing objects in front of the patient and having them step over the visual cue.

The method and system of projecting a line as an external stimuli for a patient in tandem with the use of a walker was introduced by Perry et al. (U.S. Pat. No. 5,575,294), who mount a projection device on the body of the walker, which generates a line on the ground or floor in front of the patient, and acts as the stimuli for the person to step over and end the akinetic episode. The projection device is activated by a push button, and may also include a timer that automatically extinguishes the projection light after several seconds. However, the invention disclosed by Perry et al. fails to disclose a method and device which regulates and actuates the projection device of the present invention.

The basic structure of the walking stabilizer was disclosed by Miller (U.S. Pat. No. 5,538,268), however new enhancements to the braking system for the implementation of the present invention are disclosed in this application.

SUMMARY OF THE INVENTION

The present invention utilizes a two pole series switch circuit configuration in tandem with the braking mechanism to regulate and actuate a projection device mounted to a walking stabilizer. The present invention provides a more effective method and visual cue for the Parkinson's disease sufferer to combat the effects of akinesia paradoxica, by pairing the visual cue with the physical action of closing a grip by squeezing. In addition, the present invention is an effective tool for stroke rehabilitation, and for increasing stride length of patients with walking disorders.

With the first embodiment of the present invention, the user enables the projection device option by pressing a push button switch or any other tactile or locking two position switch such as toggle, rocker, slide, rotary, selector, thumbwheel, etc. However, the projection device does not fully activate and generate the visual stimulus until the user releases the brakes from the walking stabilizer wheels, by either depressing one or both dual action hand brake levers or the backrest-middle brake bar.

In a second embodiment of the invention, after the user selects the projection device option, the visual stimulus is generated by placing the thumb on a button coupled to a capacitive sensor that is located on the hand grip of the walker stabilizer.

In a third embodiment of the invention, after the user selects the projection device option, a solid state strain-pressure sensor mounted within the grips of the walking stabilizer can be used to activate the visual stimulus when the user takes hold of the grips.

OBJECTS AND ADVANTAGES OF THE INVENTION

It is the object of the present invention to provide a walking stabilizer equipped with means to regulate and actuate a projection device for use by physically disabled persons who experience episodes of akinesia paradoxica.

Another object is to provide a two pole switch series circuit to regulate and actuate a projection device for a walking stabilizer.

Another object is to provide a novel dual action brake system and junction to work in tandem with a two pole switch series circuit to actuate a projection device.

Another object is to provide ergonomic controls molded or incorporated into the hand grips of the walker stabilizer.

Another object is to provide means to control the projection device, wherein the projection device is only turned on when the user is ready for movement, thereby conserving battery power and reducing the frequency of battery replacement, which can be challenging for the disabled user.

Another object is to provide means for preventing accidental activation of the projection device.

Another object is to provide a more effective method and visual cue for the Parkinson's disease sufferer to combat akinesia paradoxica, which is expedient, inexpensive, and easy to use, by pairing the visual cue with the physical action of closing a grip by squeezing.

These and other objects and advantages of the present invention will become more apparent as this description proceeds, taken in conjunction with the accompanying drawings.

DETAILED DESCRIPTION OF THE PREFERRED EMBODIMENTS

Figure 1:
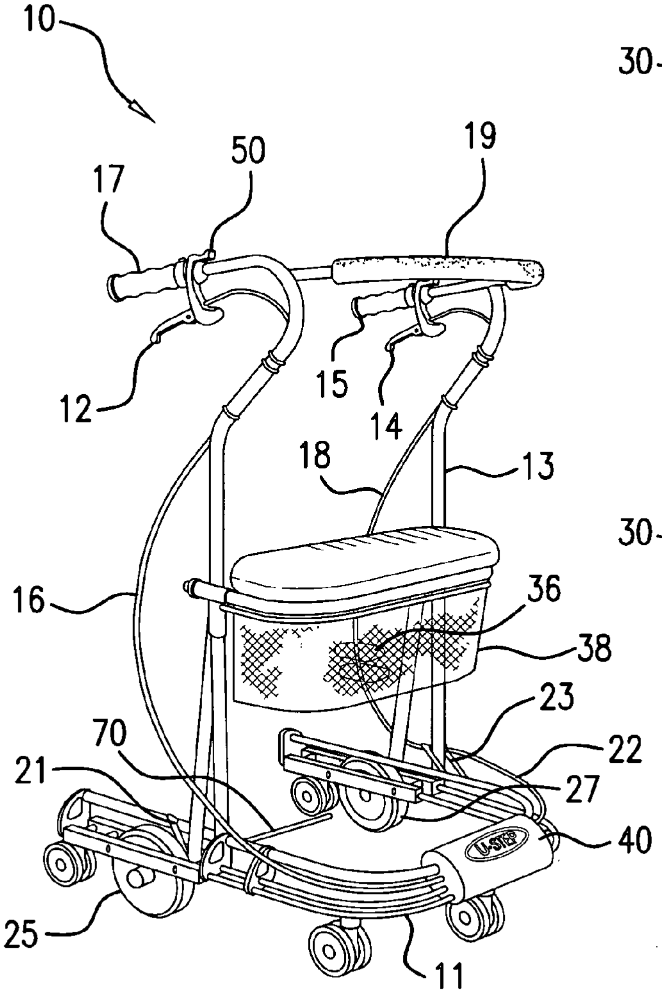
FIG. 1 is a perspective view of a walker stabilizer device embodying the present invention.

A rolling walking stabilizer device 10 of FIG. 1 embodying the present invention comprises a U-shaped base 11 and opposed upright supports 13 pivotally secured on the base. Hand grips (15 and 17), dual action hand brake levers (12 and 14), and regulator switch 50 are mounted to the top ends of the opposed upright supports 13. A backrest-middle brake bar 19 is functionally attached and integrated to the dual action brake levers 12 and 14. Upper brake cables 16 and 18 have pivotal connections 41 and 43, respectively, pivotally attached to brake junction 44, which is itself pivotally connected to pivot 46 on pulley retainer plate 42 which comprises the braking distribution device 40 of FIGS. 1, 5 and 6. Lower brake cables 20 and 22 are pivotally connected at lower pins 43 and 41, respectively, to brake junction 44 and the lower brake cables 20 and 22 are terminated at the lower brake assemblies 21 and 23, respectively. An activation switch 48, which is a contact switch, is positioned on the pulley retainer plate 42 to be within reach of the rotational travel of the brake junction 44. The activation switch 48 is electrically connected via wires 45 to the power source 36, projection device 38, and regulator switch 50.

In the normal rest state, lower brake assemblies 21 and 23 are engaged with wheels 25 and 27, respectively, and the rolling walking stabilizer 10 is in a locked position. To allow motion, the user depresses one or both of the dual action hand brake levers 12 and 14 or the backrest-middle brake bar 19, which disengages the lower brake assembles 21 and 23 from wheels 25 and 27.

The action of depressing the dual action hand brake lever 12 or 14 or the backrest—middle brake bar 19, individually, is such that both lower brakes assembles 21 and 23 are controlled concurrently. This action is facilitated by the brake distribution device 40.

Figure 5:
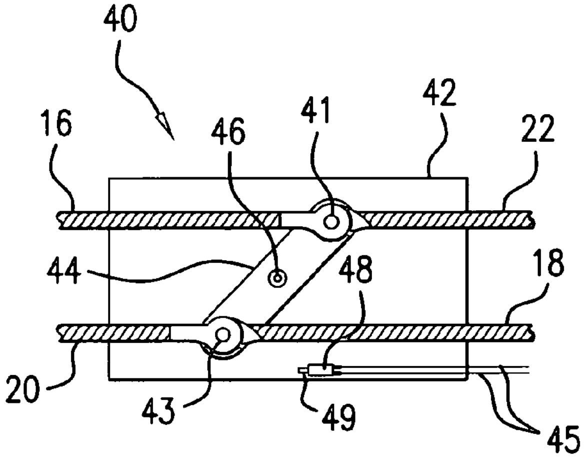
FIG. 5 is a detail view of the pulley retainer plate and brake junction with walker stabilizer brakes (not shown) engaged and activation switch in open position.

FIG. 5 shows the position of the brake distribution device 40 when the rolling walking stabilizer 10 is in the locked position. When brake lever 12 is depressed, upper brake cable 16 is pulled up, resulting in a counter clockwise rotation of the brake junction 44, which in turn pulls on both lower brake cables 20 and 22 to disengage the lower brake assemblies 21 and 23 from wheels 25 and 27. In a similar fashion, when brake lever 14 is depressed upper brake cable 18 is pulled up, which also results in a counter clockwise rotation of the brake junction 44, which in turn pulls on both lower brake cables 20 and 22 to disengage the lower brake assemblies 21 and 23 from wheels 25 and 27. Backrest-middle brake bar 19 pulls on both upper brake cables 16 and 18 concurrently, and also results in a counter clockwise rotation of the brake junction 44.

Figure 6:
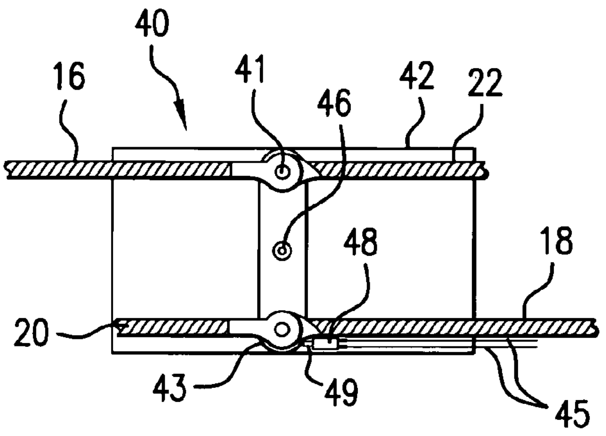
FIG. 6 is a detail view of the pulley retainer plate and brake junction similar to FIG. 5 except with walker stabilizer free to move and activation switch in closed position.

As illustrated in FIG. 6, the brake distribution device 40 permits the rolling walking stabilizer 10 to move when the lower brake assemblies 21 and 23 are disengaged from wheels 25 and 27, and the brake junction 44 is fully engaged with activation switch 48. In this state the contact portion 49 of activation switch 48 is depressed and thereby closes the activation switch 48. When the activation switch 48 and the regulator switch 50 are both closed, the projection device 38 will be enabled and a line or pattern 70 will be projected (see FIG. 1) onto floor or ground in front of the user.

Figure 7:
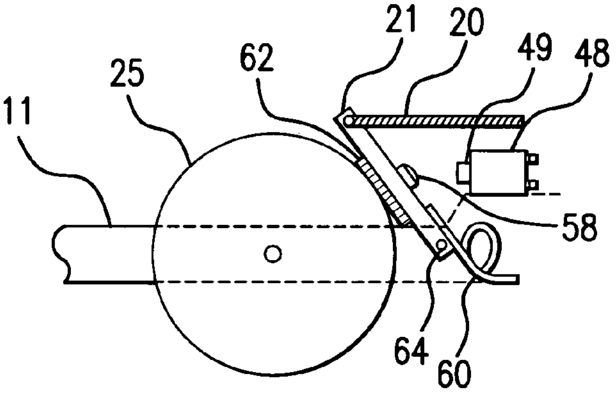
FIG. 7 is a detail perspective view, partially in section, of the lower brake assembly engaged to wheel with the activation switch in the open position mounted to the base of the walking stabilizer.

Additional variations of the first embodiment allow for the placement of activation switch 48 in the vicinity of the lower brake assembly 21 or 23, or other moving parts of the braking mechanism, where the action of disengaging the brake assembly 21 or 23 depresses the contact portion 49 of activation switch 48. FIG. 7 illustrates the placement of activation switch 48 on a section of the U-shaped base 11 next to lower brake assembly 21. When the rolling walking stabilizer 10 is in a stationary mode, biasing spring 60 pushes the lower brake assembly 21 that is pivotally connected by pin 64 to the U-shaped base toward wheel 25 resulting in brake pad 62 being in contact with wheel 25. In the instance when the walking stabilizer is free for movement, lower brake cable 20 pulls on the lower brake assembly 21 with enough tension to overcome the force of the biasing spring 60 and disengages brake pad 62 from wheel 25. When the lower brake assembly 21 is disengaged from the wheel 25, retaining nut 58 makes contact with and depresses the contact portion 49 of activation switch 48.

Figure 2:
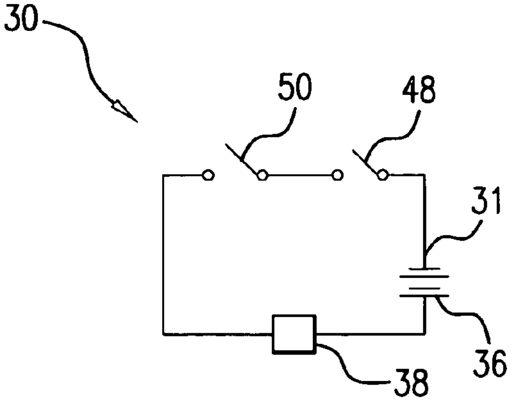
FIG. 2 diagrams the components of the regulation and actuation circuit with the projection device and power source with projection option deselected.
Figure 3:
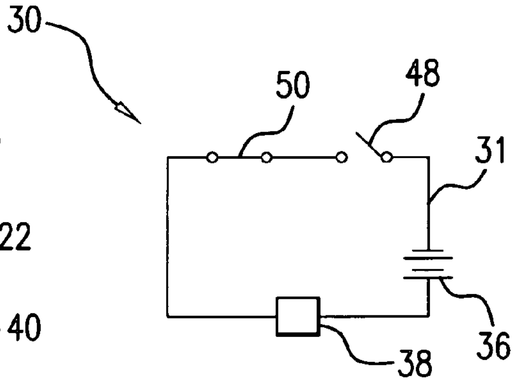
FIG. 3 illustrates the components of the regulation and actuation circuit with the projection device and power source with projection option selected.
Figure 4:
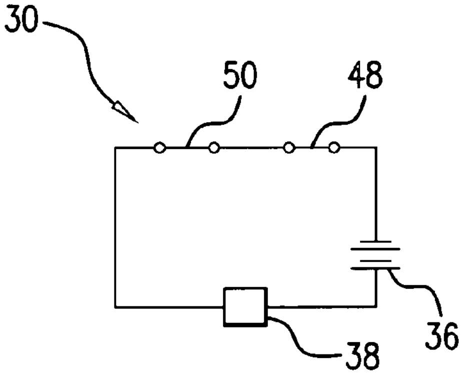
FIG. 4 diagrams the components of the regulation and actuation circuit with the projection device and power source with projection option selected and actuated.

FIGS. 2, 3, and 4 are schematic representations of the operation of the two pole switch, power source and projection device of the present invention. In FIG. 2 the walking stabilizer 10 is in a stationary mode, which is represented by an open switch condition for activation switch 48, which is in an open state when the brakes 21 and 23 are engaged to wheels 25 and 27. Regulator switch 50 is also in an open state, which is an indication that the projection device option has not been enabled.

In the schematic of FIG. 3, the user has selected the projection device option as indicated by the closed state of regulator switch 50. However, since activation switch 48 is open the projection device 38 will not be activated. The open state of activation switch 48 is representative of the brakes 21 and 23 engaged with wheels 25 and 27. Therefore, the projection device 38 is not activated until the walking stabilizer is able to move.

The schematic of FIG. 4 has a completed circuit, wherein both regulator switch 50 and activation switch 48 are in a closed state. Since both regulator switch 50 and activation switch 48 are closed, the projection device 38 is fully connected to the power source 36 and the projection device 38 will be activated. The state of FIG. 4 is equivalent to the situation depicted in FIG. 6, wherein activation switch 48 is closed when the brakes 21 and 23 are disengaged from wheels 25 and 27, and the walker stabilizer 10 is free for movement. In this case with regulator switch 50 closed and the user clasping or applying pressure to the dual action hand brake levers 12 or 14, or backrest-middle brake bar 19 the projection device 38 will be turned on.

An alternative embodiment of the present invention is shown in FIG. 7. The user selects the projection device option by depressing regulator switch 50, and activates the projection device 38 by actuating capacitive switch 52. Hand grip 54 is ergonomically designed such that the users thumb is naturally placed on capacitive switch 52. In general, a capacitive switch senses the presence of the users finger tip and closes itself when the finger is in contact with the surface of the switch. In the present embodiment capacitive switch 52 takes the place of activation switch 48 of the first embodiment, and acts to actuate the projection device 38.

Figure 8:
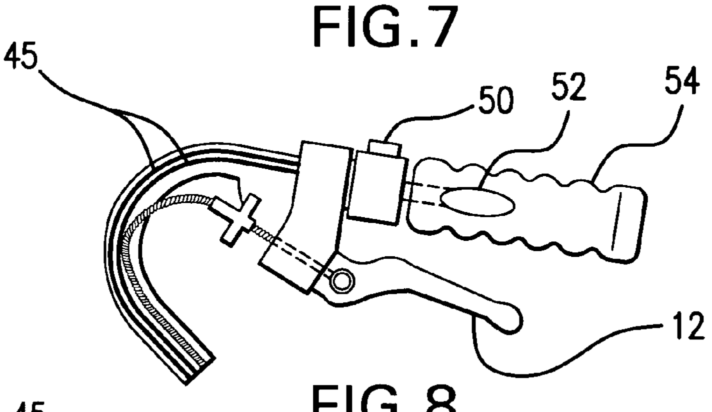
FIG. 8 is a detail perspective view, partially in section, of the brake control lever with button coupled to a capacitive sensor (shown in broken lines) mounted within the hand grip.
Figure 9:
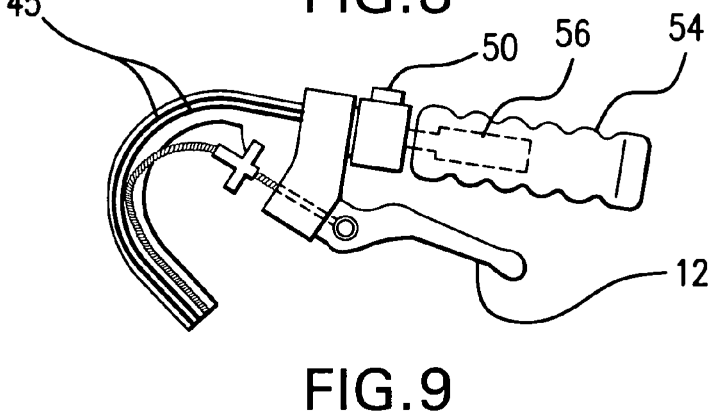
FIG. 9 is a detail perspective view, partially in section, of the brake control lever with a pressure sensitive switch (shown in broken lines) mounted within the hand grip.

In a third embodiment, shown in FIG. 8, a pressure sensitive switch 56 is contained within hand grip 54. When the user squeezes and/or places downward pressure on hand grip 54, the pressure sensitive switch is activated. If the projection device option has been selected via regulator switch 50, and the pressure sensitive switch 56 is activated, the projection device will be turned on.

While the preferred embodiments of the invention have been disclosed in considerable detail, variations based on the inventive features disclosed herein may be made within the spirit of the invention, and the scope of the invention should not be limited by the examples or to the exact construction shown or described. To properly determine the scope of the invention, an interested party should consider the claims herein, and any equivalent thereof.

Having thus described my invention, I claim:

1. A device to regulate and actuate a projection instrument for use on a walking stabilizer, said device comprising: switch means for controlling said projection instrument; a power source; braking mechanism for controlling movement of said walking stabilizer and actuation of said switch means; said walking stabilizer further including support means and an attachment structure for said projection instrument, wherein said switch means comprises:

a first switch; and a contact switch;

wherein said first switch is a tactile locking two position switch; and, wherein said first switch and said contact switch are connected in series with said power source and said projection instrument.

2. The device of claim 1 wherein said switch means comprises a two pole switch circuit.

3. The device of claim 1 wherein said support means comprises a right support member and a left support member.

4. The device of claim 3 wherein said support members are upright.

5. The device of claim 1 wherein said first switch is mounted on said support means and acts to regulate said projection instrument when said first switch is in the locked position.

6. The device of claim 1 wherein said walking stabilizer has a base and a plurality of wheels; and said contact switch is mounted on said base; and wherein said plurality of wheels are in contact with said braking mechanism.

7. The device of claim 1 wherein said contact switch is operable with said braking mechanism and acts to actuate said projection instrument when said contact switch is in the closed position and said first switch is in a locked position.

8. The device of claim 1 wherein said braking mechanism comprises: a right bicycle type handbrake mechanism;

a left bicycle type handbrake mechanism;

a backrest-middle brake bar functionally connected to both of the said right and left handbrake;

a brake junction;

a right upper brake cable connected to said right bicycle type handbrake and pivotally connected to the upper portion of said brake junction;

a left upper brake cable connected to said left bicycle type handbrake and pivotally connected to the lower portion of said brake junction;

a right lower wheel brake;

a right lower brake cable pivotally connected to the lower portion of said brake junction and to said right lower wheel brake;

a left lower wheel brake;

a left lower brake cable pivotally connected to the upper portion of said brake junction and to said left lower wheel brake;

a pulley retainer plate;

wherein said brake junction is pivotally connected at its center to said pulley retainer plate; and said brake junction is reciprocated in response to forces exerted by said right and said left upper brake cables concurrent to movement of said right and said left bicycle type handbrake, or movement of said backrest-middle brake bar; and wherein said contact switch is actuated by the reciprocation of said brake junction.

9. The device of claim 1 wherein said braking mechanism comprises:

at least one brake lever mechanism mounted to said support means;

a brake junction;

an upper attachment means; and wherein said brake lever mechanism is connected by said upper attachment means to said brake junction.

10. The device of claim 9 wherein said walking stabilizer has a base and a plurality of wheels; and said braking mechanism further comprises at least one wheel brake mechanism;

wherein said wheel brake mechanism is in contact with said plurality of wheels mounted to said base;

a lower attachment means; and wherein said wheel brake mechanism is connected by said lower attachment means to said brake junction; and wherein said brake junction is rotatably connected to said base and is in contact with said switch means.

11. The device of claim 9 wherein said brake junction rotates in an arc between 0 and 90 degrees in response to forces exerted by said upper attachment means concurrent to the movement of said brake lever mechanism; and wherein said switch means is actuated by said brake junction's rotation.

12. A projection instrument for a walking stabilizer having brakes and wheels, wherein said projection instrument projects a pattern substantially perpendicular to the path of travel and further comprises control means wherein said pattern is generated when said walking stabilizer is enabled for movement by releasing said brakes, said control means having switch means for enabling said projection instrument only when said brakes are disengaged from said walking stabilizer.

13. In the projection instrument recited in claim 12, said switch means comprising:

a first switch; and a contact switch; and wherein said first switch is a tactile locking two position switch; and wherein said first switch enables said projection instrument; and wherein said contact switch is actuated by said walking stabilizer brakes and turns on said projection instrument when said brakes are disengaged from said walking stabilizer wheels.

14. The projection instrument recited in claim 12 wherein said control means further comprises a two pole switch circuit comprising:

a first switch; and a capacitive switch; and wherein said first switch is a tactile locking two position switch; and wherein said first switch enables said projection instrument; and wherein said walking stabilizer has brake means and said capacitive switch is ergonomically molded into said brake means; and said capacitive switch is adapted to sense the user's touch and closes in response to said user's touch to actuate said projection instrument.

15. The projection instrument recited in claim 12 wherein said control means further comprises a two pole switch circuit comprising:

a first switch; and a pressure switch;

wherein said first switch is a tactile locking two position switch; and wherein said pressure switch is ergonomically molded into the hand grip of said walking stabilizer;

said walking stabilizer has braking means actuatable by a hand grip means, and said pressure switch is adapted to sense the user's weight applied to said hand grip means and said pressure switch closes in response to the user's touch to actuate said projection instrument.

* * * * *